Inventors
Louis S. Conover, Jr.
Paul M. Kintner
By H R Rather
Attorney

Inventors
Louis S. Conover, Jr.
Paul M. Kintner
By H R Rather
Attorney

Inventors
Louis S. Conover, Jr.
Paul M. Kintner
By H/R Ratter
Attorney

United States Patent Office 3,268,710 Patented August 23, 1966

3,268,710

COUNTER TOTALIZER FOR RANDOMLY OCCURRING SIGNALS FROM A PLURALITY OF SOURCES

Louis S. Conover, Jr., North Babylon, and Paul M. Kintner, Huntington Station, N.Y., assignors to Cutler-Hammer, Inc., Milwaukee, Wis., a corporation of Delaware Filed Aug. 27, 1962, Ser. No. 219,530
4 Claims. (Cl. 235—92)

This invention relates to apparatus for counting randomly occurring signals coming from independent sources which may occur simultaneously, and continuously totalizing them accurately in an individual counter.

While not limited thereto, this invention is particularly suited for a central counting unit for the output of a multiple press newspaper printing plant to provide a running total of the individual newspapers in the lapped streams of all the conveyors coming from the press room, so that at all times it may be accurately known how many papers have been run and how many more must be printed to complete the run.

In modern newspaper producing facilities such centralized counting is desired to provide an indication of the number of papers produced from a number of simultaneously operating presses and to keep an accurate running total of the papers delivered to the mailroom, thereby permitting accurately controlled production, eliminating costly under-runs or over-runs, and allowing maximum time to prepare the presses for the next edition.

Prior apparatus for continuously accumulating the totals of randomly occurring signals from independent sources have proven unsatisfactory in certain respects. For example, when two or more signals from independent sources occur simultaneously or nearly simultaneously, counts may be lost and the central counter may register less than the true total. Also some devices temporarily store input signals for subsequent segregation to the central counter. These devices require complicated or additional memory storage circuitry. Furthermore, apparatus which sequentially scan the random source input signals may register false counts when a scan occurs coincident or nearly coincident to a count input signal.

Accordingly, it is an object of this invention to provide an improved random counting apparatus which overcomes the aforementioned and other difficulties.

Another object of this invention is to provide an improved counting device that may accept simultaneous counts from a plurality of independent sources and insure that all true counts and no others are totalized.

Still another object is to provide an improved totalizing device which afford an accurate count and is capable of operation at relatively high speeds.

Still another object is to provide an improved totalizer which is reliable over a wide range of operating conditions found in practice.

It is another object of this invention to provide a relatively simple transistorized circuitry which may be standardized for quantity production saving considerable manufacturing design and expense.

Other objects and advantages will hereinafter appear.

The accompanying drawings illustrate the preferred embodiment of the invention, it being understood that the embodiment shown is susceptible of modifications with respect to certain details thereof, without departing from the scope of the appended claims.

In the drawings:

FIGURES 1*a* and 1*b* taken together comprise a schematic block diagram of a complete counter totalizer;

Figure 1A:
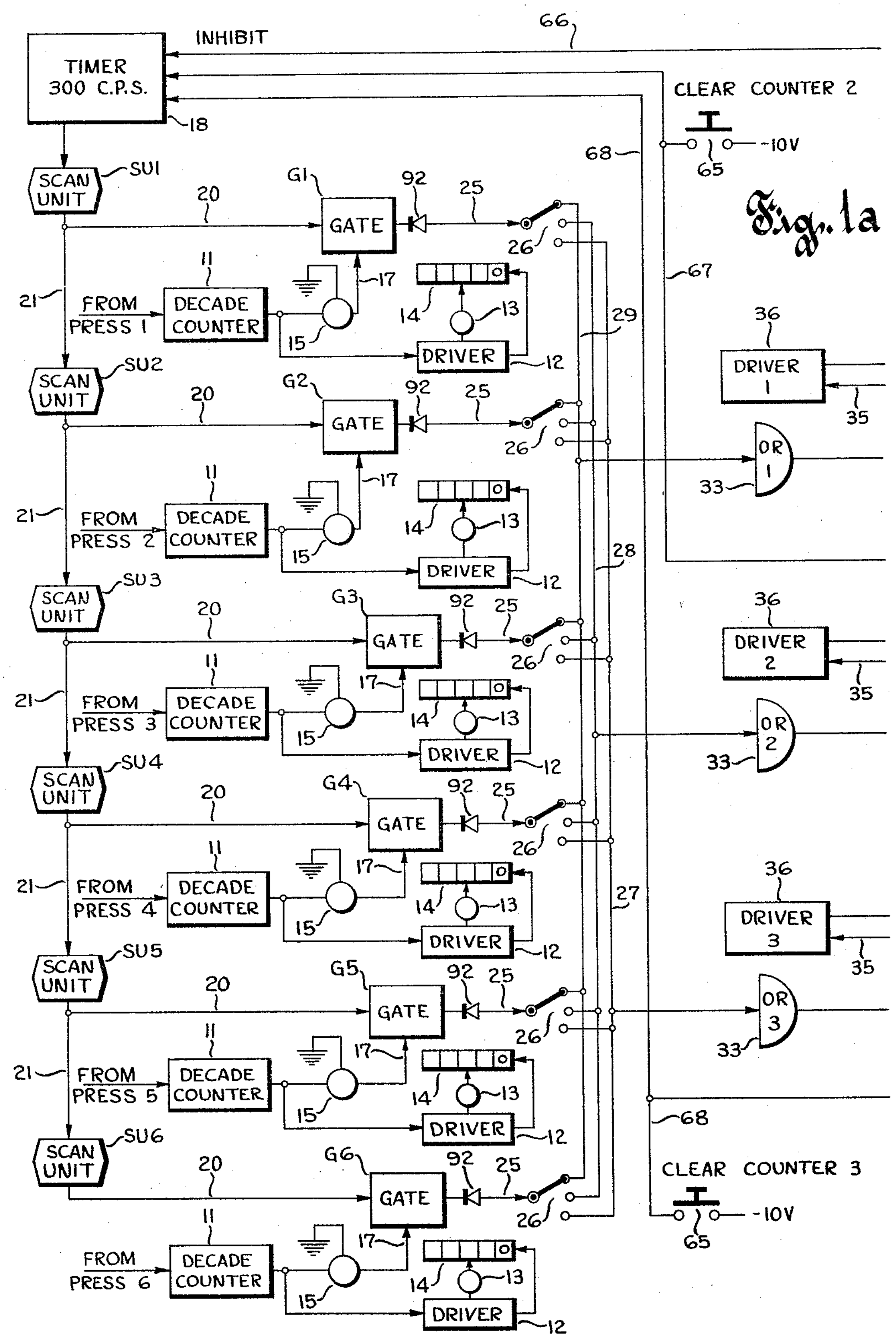
Figure 1B:
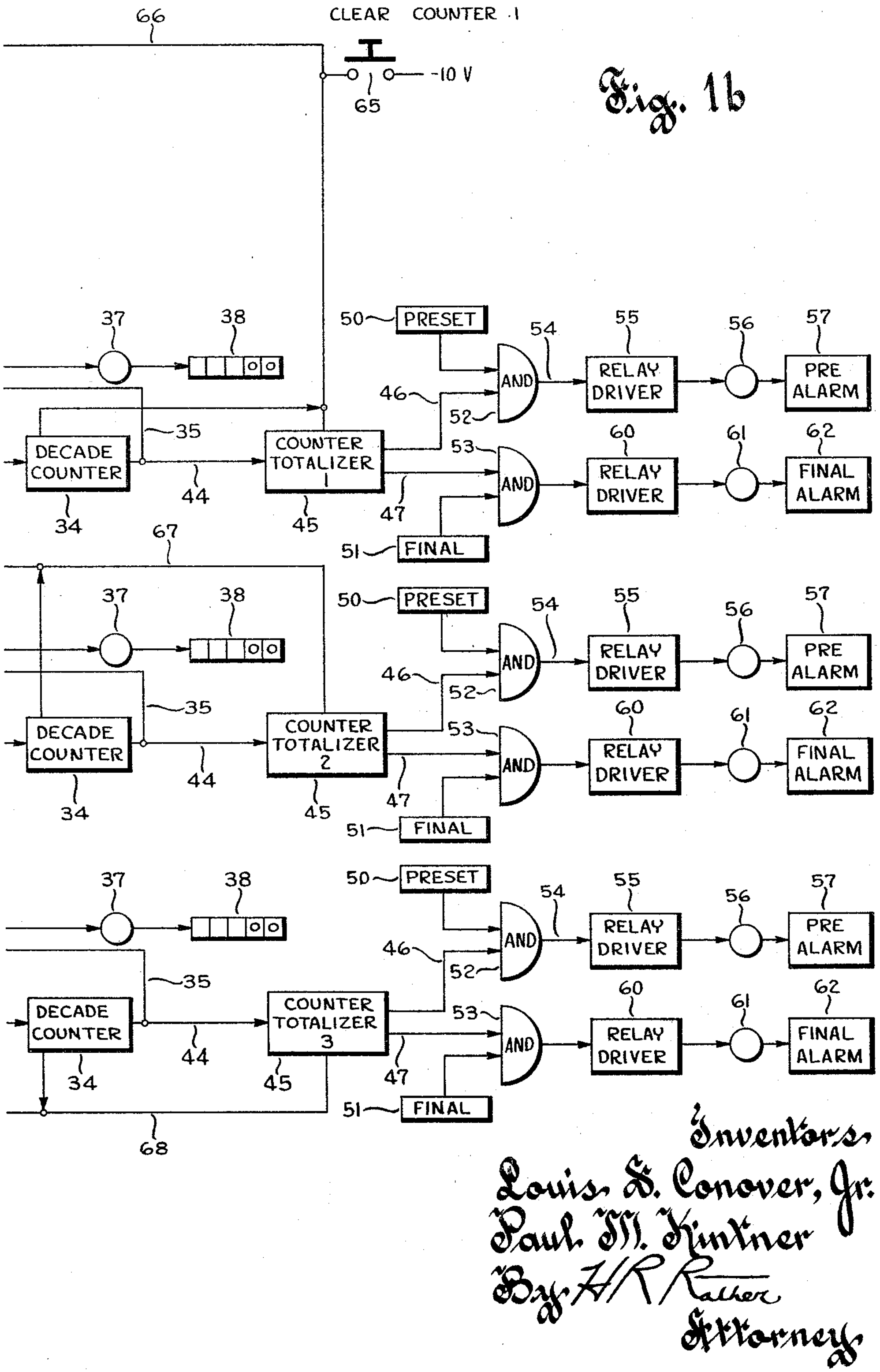
Figure 2:
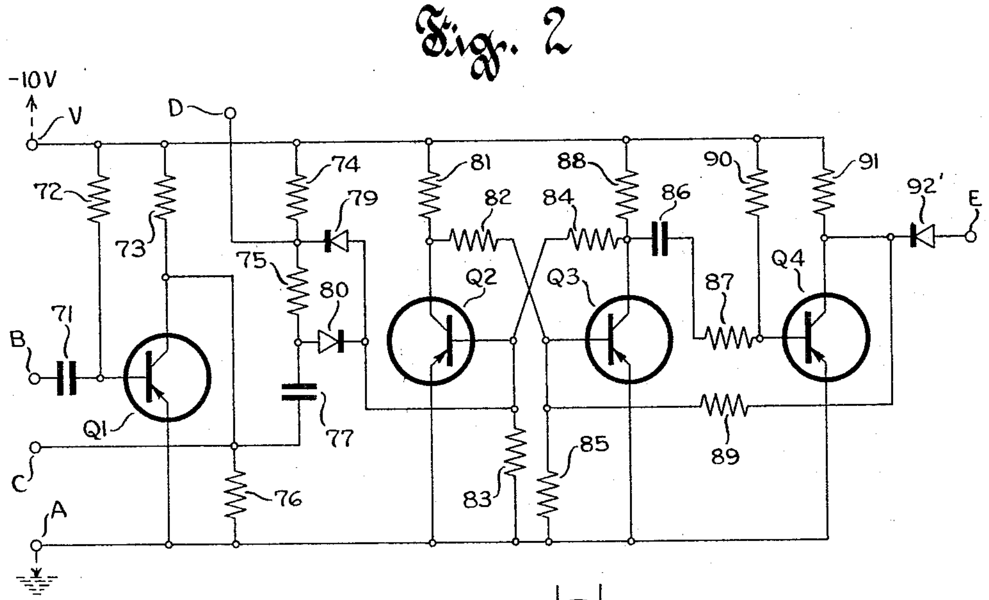
FIG. 2 is a detailed circuit diagram of a specific embodiment of a programmer unit used in the counter totalizer of FIG. 1.
Figure 3:
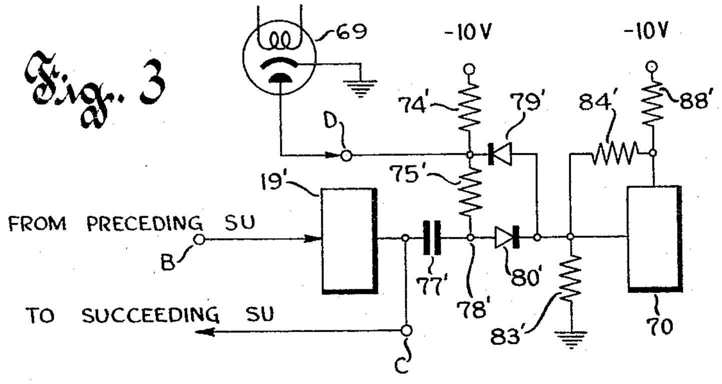
FIG. 3 is a simplified showing of the circuitry of FIG. 2.
Figure 7:
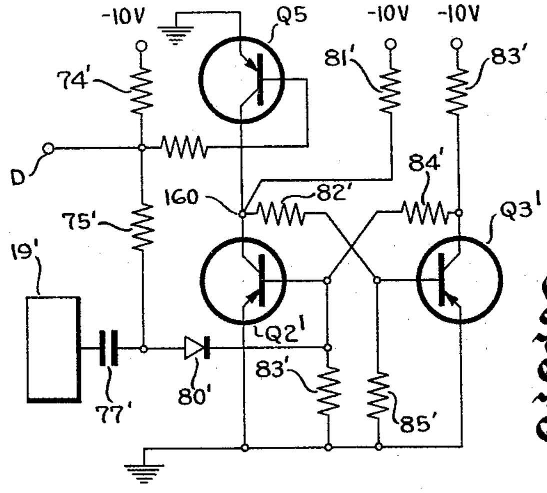
Figure 4A:
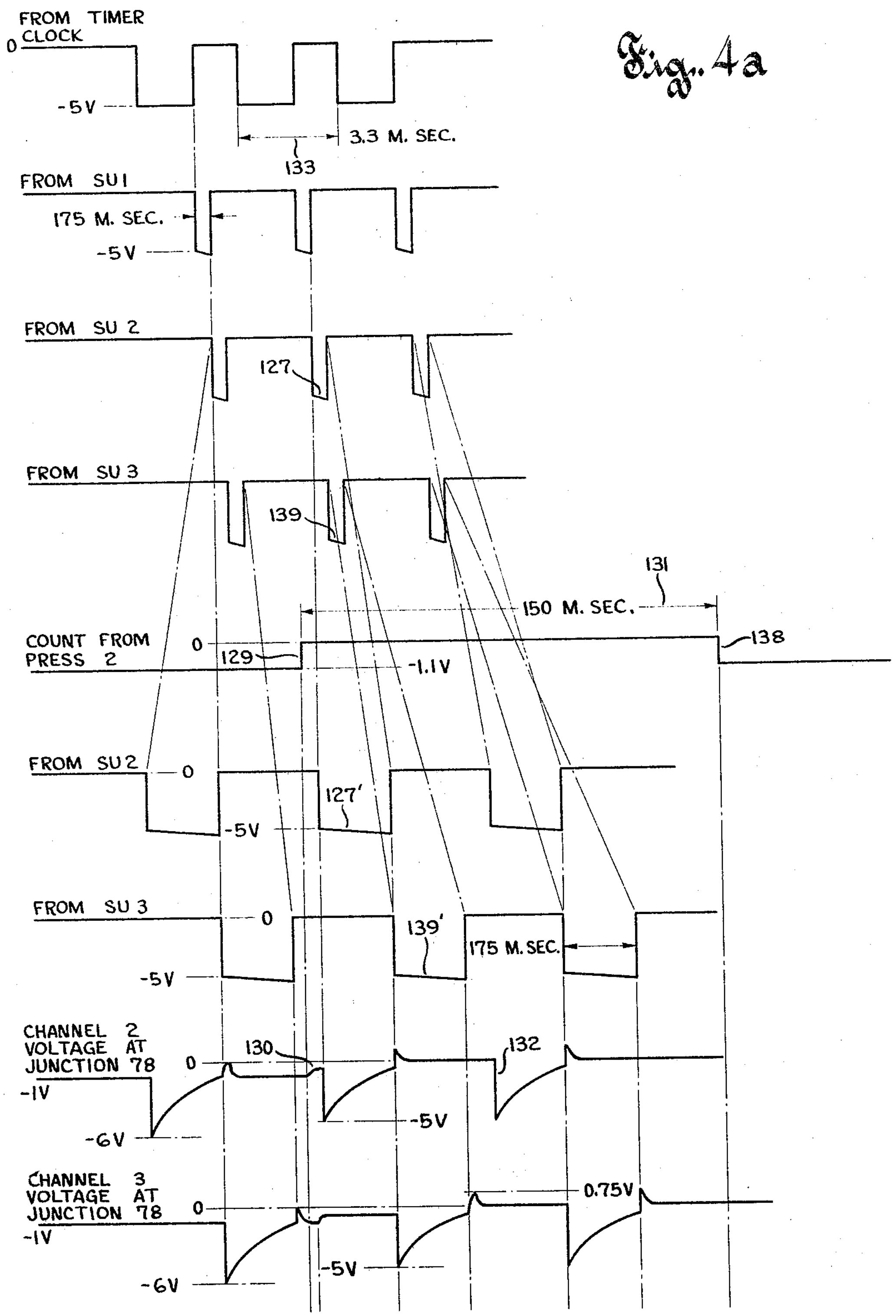
Figure 4B:
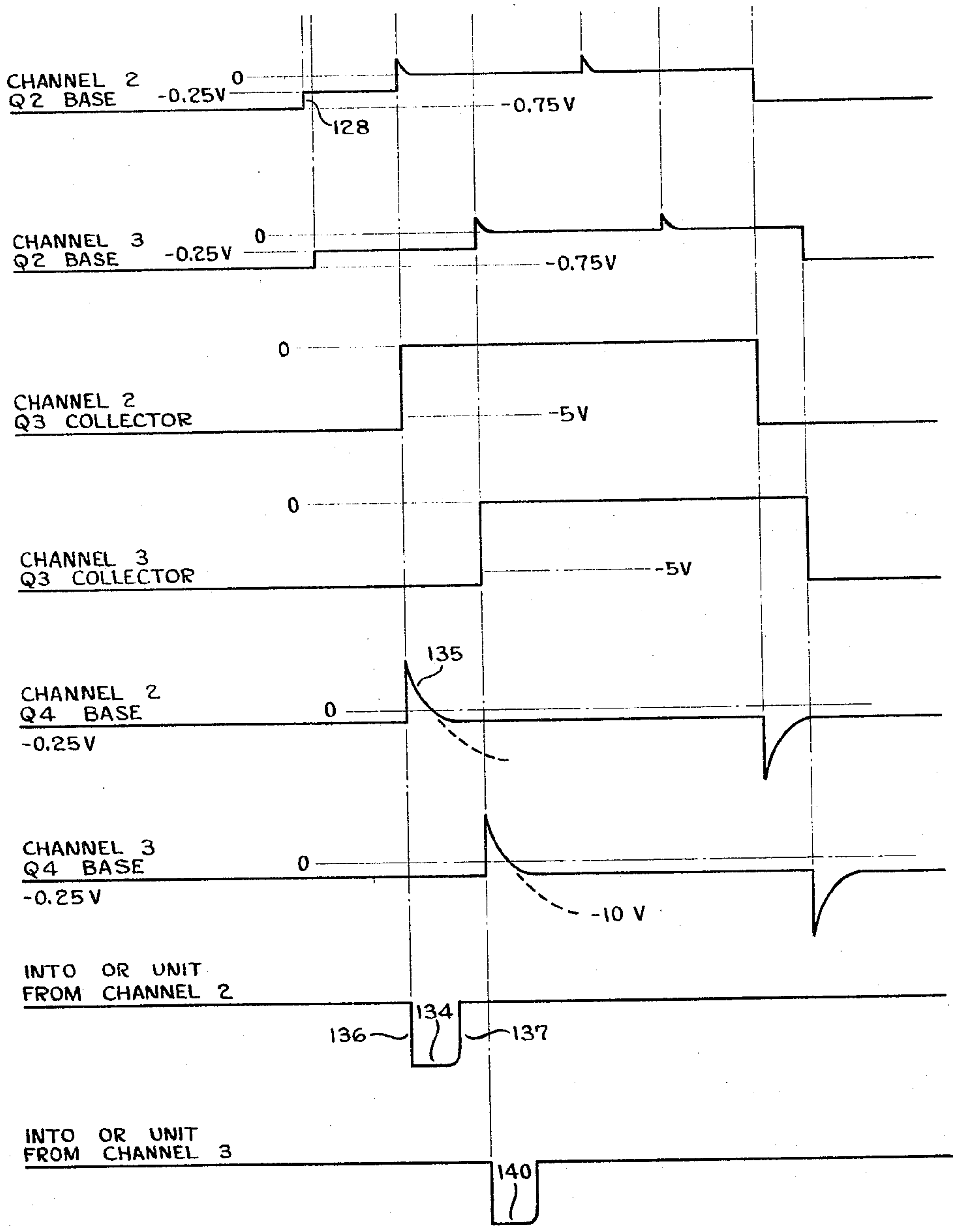
Figure 5:
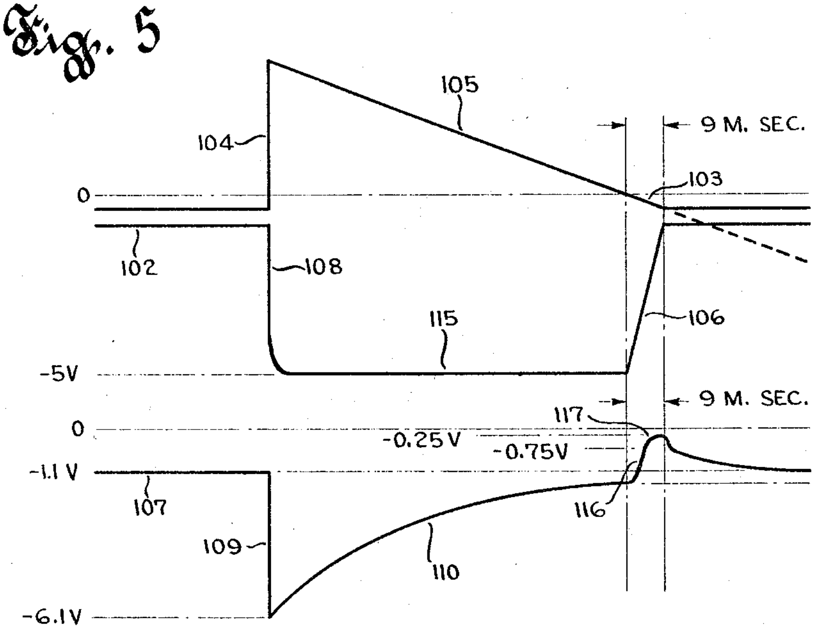
Figure 6:
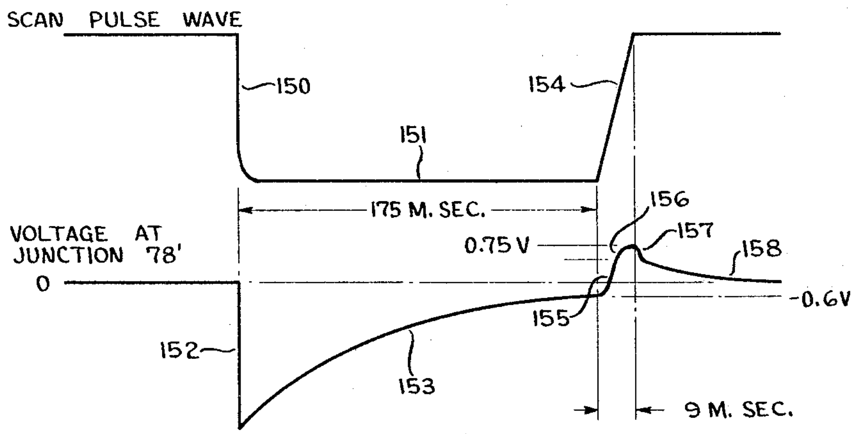
Figure 9:
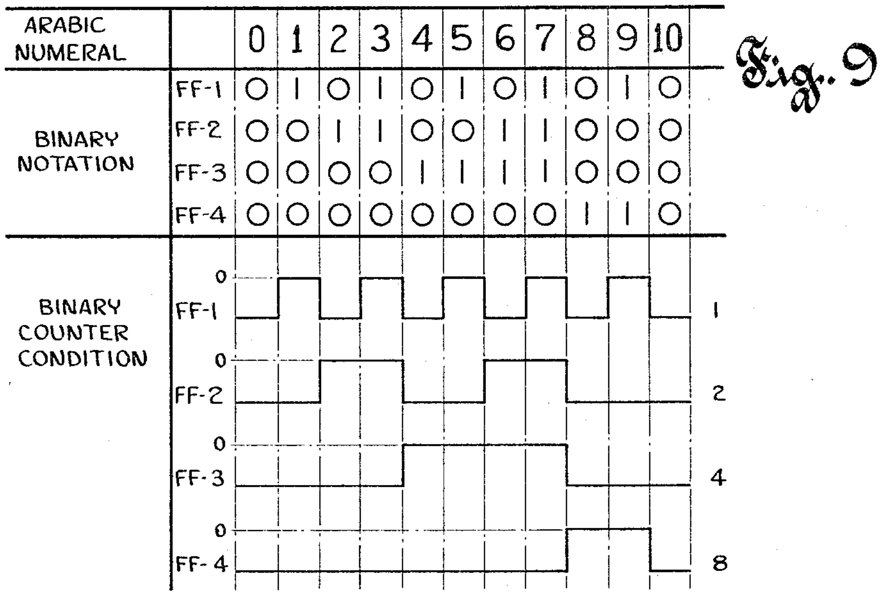
Figure 8:
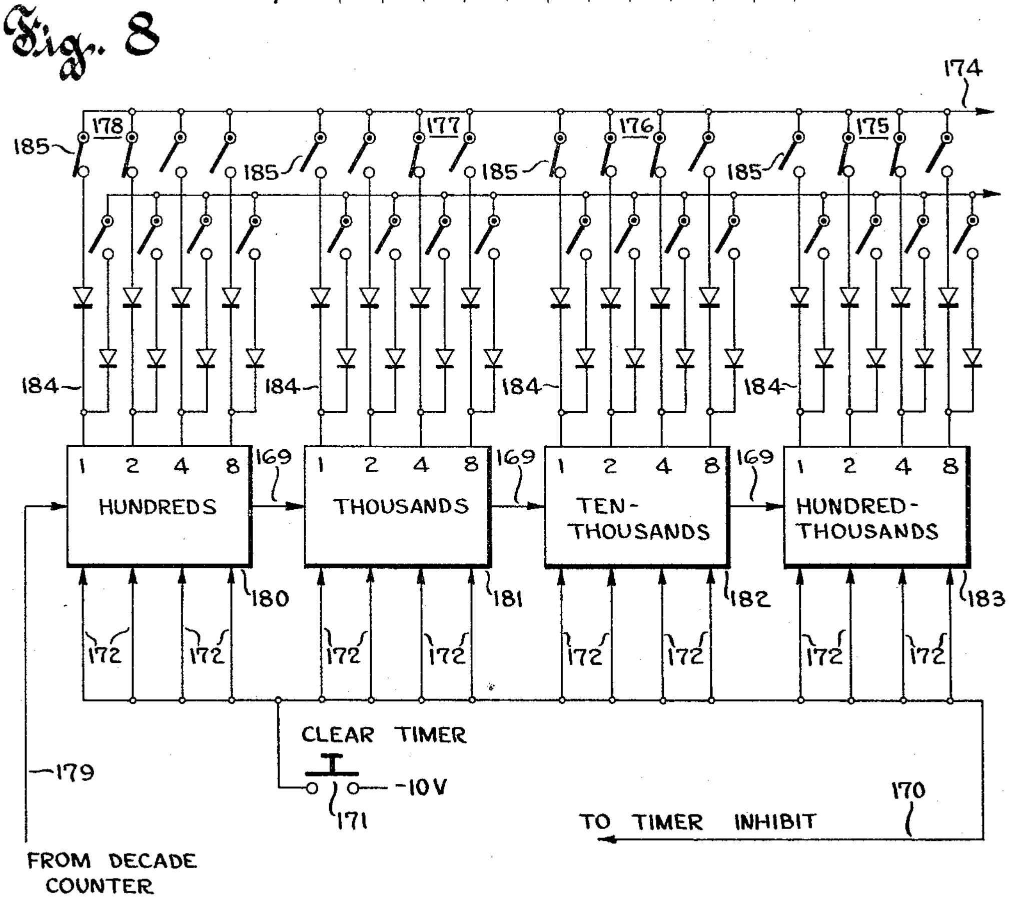

FIGS. 4*a* and 4*b* show waveforms for the circuits of FIGS. 1–3;

FIGS. 5 and 6 are enlarged waveforms for portions of the circuits of FIGS. 2 and 3 in accordance with the purposes of this invention;

FIG. 7 is an alternative form of programmer unit showing portions of the trigger switch; and FIGS. 8 and 9 are schematic diagrams of the central counter-totalizer and associated apparatus used therewith and waveforms explanatory thereof.

The totalizer embodiment shown in FIG. 1 incorporating the invention performs three general functions. First, it displays the output count of each press on individual counters. Second, the totalizer has three central counters which will accept counts from any or all presses so that the output count for editions being run simultaneously on several presses can be shown. Third, all three of these latter counters have preset switches that can be set so that when an edition nears completion a pre-alarm and then a final alarm will be energized to facilitate proper slowing down and stopping of the presses.

The embodiment described herein, while not limited thereto, is designed to receive individual random count signals from newspaper presses by a counting switch which rides over the newspapers in the lapped stream on single conveyors coming from each press and is tripped by the leading edge of the papers, thereby sending out count pulses as described in U.S. Patent No. 3,027,075 entitled Counting Device, Frederic E. Howdle, et al., inventors.

Referring specifically to FIG. 1 for a schematic diagram system, the count pulses travel to the decade counter associated with each press as shown at 11. The decade counter counts the individual pulses and emits a single countdown pulse for every 10 pulses of input. The countdown pulses leaving decade counters 11 travel to driver 12, which energizes relay 13, thereby actuating individual press counters 14 to provide a visual display of the number of papers leaving the press. Counter 14 counts by tens and is provided with a fixed zero in the units position to indicate the countdown by 10.

Timer 18 supplies clock pulses to scan unit SU1 as shown at 22 as specifically described in U.S. patent application, Serial No. 143,925, filed October 9, 1961, now Patent No. 3,189,755, entitled Control Modules and Circuits, P. M. Kintner, inventor. Scan unit SU1 delays these pulses and provides a delayed pulse output to scan unit SU2. SU2, in turn provides a delayed pulse to scan unit SU3 which in turn provides delay pulses successively through the succeeding scan units to scan unit SU6. The output pulses from each scan unit in addition to being sent to the succeeding scan unit through lines 21 are simultaneously supplied through lines 20 to its associated gate circuit. The effect is that successively in time each scan unit supplies a delay pulse to an associated gate unit. The successive scan pulses may be seen in FIG. 4. The clock pulse period as shown is longer than the total delay time between the output pulse of scan unit SU1 and the output pulse of scan unit SU6, to insure that no two scan pulses are supplied to different gate units simultaneously.

The countdown pulses leaving decade counters 11 are simultaneously supplied to associated relays 15 causing normally open contact to close thereby supplying a ground potential to gates 16 (G1 to G6), through lines 17. The countdown pulse signal supplied to any relay 15 is maintained for at least the period of the timer clock. Consequently the next delay pulse from the associated scan unit can cause a count pulse to be gated out of gate unit 16 through line 25. Since the delayed scan pulses can never occur simultaneously, no two counts can be gated out of gates G1 through G6 at the same time.

The output of each G1–G6 gate 16 is supplied through a line 25 to the common of an associated switch 26, the totalizer selector switch for each press input channel. Switch 26 may be connected to one of three positions, each associated with a different central totalizer. When a switch 26 is direct connected to line 27, count pulses are fed directly to "OR" gate 3 at 33 supplying counts to decade counter 34 and to central counter-totalizer unit 3. When switch 26 is direct connected to line 28, count pulses are fed directly to OR gate 2 eventually reaching central totalizer 2. When switch 26 is direct connected to line 29, count pulses are fed directly into OR gate 1 and subsequently to counter totalizer 1.

By connecting the individual channel switch 26 in various combinations to lines 27, 28 or 29, counts from any or all presses may be sent to any central counter totalizer. In the embodiment shown in FIG. 1 three central counter totalizers are displayed. In actual practice more or less central counters may be used as meets the requirements of particular systems.

A count pulse fed directly through the OR unit 33 is sent directly to a decade counter 34 whose count is increased whenever a pulse is received. Every tenth pulse received by decade counter 34 is fed simultaneously through line 35 to an associated driver unit 36, and through line 44 to an associated central totalizer counter. Pulses received by a driver unit 36 energizes a relay 37 causing the mechanical counter associated with its central totalizer to register a count. Mechanical counters 38 are supplied with fixed zeros in the units and tens decimal place to visually display totals to the nearest 100 papers since individual newspapers are counted down by tens at decade counters 11 and again counted down by ten at decade counters 34. The countdowns are merely for the expedience of insuring faster and more reliable operation. It should be understood that, as where faster and more reliable mechanical counters can be used, countdowns are not necessary for the purposes of this invention.

Counter 45 totalizes all the counts received from the individual presses directly connected through switches 26. Counter 45 increases its count by one every time a pulse is received from decade counter 34. The output of counter 45 is fed through lines 46 and 47 to two preset AND switches 52 and 53. AND switch 52 is the pre-alarm preset switch and AND switch 53 is the final alarm preset switch.

AND switches 52 and 53 are coincident networks which supply an output signal when the count of counter 45 corresponds to the count placed into preset switches 50. When counter 45 reaches the count which corresponds to the predetermined count to which preset 50 has been set, AND switch 52 is actuated and an output is supplied through line 54 to relay driver 55 energizing relay 56, causing pre-alarm 57 to turn on. Pre-alarm 57 may consist of lights, horns, buzzers, etc., announcing the count that has been reached. When counter 45 subsequently reaches the count which corresponds to the number to which final preset 51 has been set AND 53 is activated and a signal will be sent to relay driver 60, thereby energizing relay 61 and final alarm, horns, and lights 62.

The pre-alarm is set to a predetermined count, usually some thousand papers less than the final desired count. When the pre-alarm count is reached, an alarm will be sent to the pressroom indicating that they are within a given count of the total required for the run. The press room is then able to shut down all but one press and finish the balance of the run on that press. In the meantime the rest of the presses can be prepared for the next run. When the final count is reached a second alarm will sound to indicate that the run is finished, and the required number of papers has reached the mail room. The alarm system may be modified as meets the requirements of particular applications.

Clear switches 65 are provided to clear counters 45 and 34. When clear switch 65 is closed all counters 11, 34 and 45 will be cleared to zero through lines 66, 67 and 68. At the same time the aforementioned operation of any clear switch 65 inhibits the clock pulses from timer 18 through lines 66.

Referring to FIG. 2, it shows a module circuit comprising input terminals B and D, and two output terminals C and E. Terminals V and A are for the power supply. PNP transistors are here employed for Q1, Q2, Q3 and Q4 so that the negative side of the power supply is connected to the collectors. Usually the emitter terminal A is grounded and a negative voltage of proper value, say −10 volts, is provided at terminal V. However, if desired, terminal V could be maintained at ground and a positive potential applied to A. Here it will be assumed that the emitter terminal A is grounded for purposes of explanation.

With PNP transistors, a transistor will be "on" when current is being drawn from emitter to base by application of negative potential through a base resistor. For the "off" condition herein the base must only be slightly negative to ground or positive to ground. To turn a transistor on, a negative voltage from base to emitter is applied. To turn it off, a negative voltage from base to emitter does not exceed about 50 millivolts in order that the transistor will turn off reliably under operating conditions.

Input terminal B is the input terminal to a scan unit (SU1 to SU6) comprising of resistors 72, 73 and 76, capacitor 71 and transistor Q1. Terminal C is the output of that scan unit. Input terminal D is the input for a count pulse supplied from relay 15 of FIG. 1. Output terminal E is the output of the gate unit 16 of FIG. 1.

Reference is momentarily made to FIG. 5 for waveforms explanatory of the scan unit portion of the module circuit shown in FIG. 2. Scan pulses are initiated by the positive going lagging edge of the clock signal in FIG. 4. Each succeeding scan pulse is initiated by the positive going lagging edge of the preceding scan pulse.

Originally transistor Q1 is maintained in the fully conducting state through resistor 72 connected to the negative power supply. The collector of Q1 is maintained approximately at ground in this condition as shown at 102, the emitter-collector resistance of a fully conducting transistor being small.

When a positive going lagging edge is fed into a scan unit input terminal B, a positive potential is coupled through coupling capacitor 71 to the base of transistor Q1, as shown at 104. Transistor Q1 turns off supplying approximately a −5 volt potential at the Q1 collector as shown at 108 due to the voltage idvision effect of resistors 73 and 74. The right-hand plate of capacitor 71 then begins a slow discharge through resistor 72 to minus 10 volts as shown at 105. As this slow discharge begins to pass through the conducting zone of transistor Q1, approximately −50 millivolts to −250 millivolts current will begin to flow through the base emitter path of Q1 and continue to increase until Q1 is turned on completely to saturation. During this period, say approximately 9 microseconds as shown at 103, the collector of Q1 rises from −5 volts to ground as shown at 106, thus terminating the generated scan pulse 115.

FIG. 3 is a simplified showing of the module circuit of FIG. 2 wherein the scan and transistor switch portions (gates G1 to G2 of FIG. 1) of the circuits are schematically depicted by rectangles. Coupling capacitor 77′ is provided between the scan network 19′ and isolating diode 80′ in series with the transistor switch 70. Resistor 75′ as shown, is connected between the junction of the scan capacitor and isolating diode 80′ and at the other end of resistor 74′ providing a high impedance path to the negative potential supply and count input terminal D. Reset diode 79′ is poled between switch 70 and count input terminal D to isolate a count signal from triggering switch 70 before a scan signal comes along; to hold the switch from triggering when a "no" count signal and scan signal are simultaneously applied; and to provide a low impedance reset for the switch circuit 70.

When relay 69 (relay 15 of FIG. 1) is open, count input terminal D is held at a negative potential; diode 79′ is biased to conduction and the input to switch 70 is held negative through ground return resistor 83′. It is here assumed that the switch circuit is in one state when the potential of its input is considerably negative to ground, and is triggered to its opposite state when its input potential is at or near that of ground and sufficient current is supplied thereto.

The voltage division produced in the conducting path (consisting of resistors 74′, 83′ and diode 79′) when relay 69 is "open" provides terminal D at say, 1.1 volts, and the input to switch 70 at −0.75 volt. If this condition is maintained for a sufficient time junction 78′ will be at −1.1 volts as shown in FIG. 5 at 107 and isolating diode 80 is biased to non-conduction.

In this condition when a negative going leading edge 108 of a scan pulse 115, is applied to coupling capacitor 77′, a 5 volt negative potential is coupled through capacitor 77′ to junction 78′, bringing junction 78′ to approximately −6.1 volts negative as shown at 109. The right plate of capacitor 77′ then begins to charge through resistor 75′ back toward −1.1 volt, indicated at 110. Upon termination of scan pulse 115, the positive-going trailing edge 106 tends to couple a potential which is positive to ground through capacitor 77′ and diode 80′ to the input of switch 70 tending to trigger the switch. However, this action is inhibited and the input potential to switch 70 does not rise sufficiently positive for triggering to occur.

The trailing edge 106 of pulse 115 begins to couple a positive going potential through capacitor 77′ to junction 78′ as shown at 116. When the potential at junction 78′ rises more positive than −0.75 volt, diode 80′ begins to conduct, providing a low impedance path to power supply terminals through conducting diodes 80′ and 79′. Consequently, the time constant of the capacitor network is considerably reduced. The ramp potential 106 supplied to the left plate of capacitor 77′ limits the subsequent potential rise at the other plate to a magnitude equivalent to the product of the time constant of the network (in seconds, of course, where the time constant is considerably less than one, as here) and the slope of the input ramp (in volts per second) where the ramp is applied for a minimum of a few time constants in order for the charging of the capacitor to reach its steady state value. When the ramp is applied for less than a few time constants, the limiting value is necessarily less because the potential rise is terminated prematurely by the termination of the input ramp. This product and the time duration of the ramp are so adjusted with respect to the potential of junction 78′ just before diode 80′ turns on, so as to limit the further voltage rise at junction 78′ such that the potential at junction 78′ does not go above ground. This potential rise at junction 78′, when diode 80′ begins to conduct, is shown at 117.

In the embodiment herein the voltage at junction 78′ rises to a maximum of −0.2 volt and the potential at switch 70 rises to −0.6 volt, the difference being the voltage drop through diode 80′. As a result switch 70 is not triggered.

Referring now to FIG. 4*a*. When terminal D is brought to ground as shown at 129, as a result of the application of a count pulse closing relay 69, then diode 79′ becomes biased to non-conduction isolating the ground potential at terminal D from the trigger and remains in its quiescent state at a negative potential through resistors 84′ and 88′ to the negative voltage supply. The potential at the trigger switch input rises somewhat, say to −0.25, as indicated at 128. Because of the small forward bias resistance of diode 79′ resistance 74′ is isolated from the trigger switch input.

Capacitor 77′ now begins to discharge through resistor 75′ toward ground as shown at 130, but only rises to essentially the voltage at the trigger switch 70 input, −0.25 volt, as diode 80′ begins to conduct.

The next scan pulse 127 as magnified at 127′ causes the potential at the input of trigger switch 70 to be positive with respect to ground, thereby triggering switch 70.

Referring now to FIG. 6 for a detailed look at the action of the first scan pulse 127′ on the network of FIG. 3 after terminal D has been grounded by a count signal. A negative going leading edge 150 of scan pulse 151 couples a negative potential through capacitor 77′, as shown at 152, turning diode 80′ to non-conductance once more. Capacitor 77′ again discharges toward ground through resistor 75′ as shown at 153. At the positive going trailing edge 154 of scan pulse 151 a positive potential with respect to ground is coupled to junction 78′ through capacitor 77′. The potential at junction 78′ first rises rapidly positive as shown at 155, essentially following the rise of ramp 154 until diode 80′ goes hard into conduction.

Differentiation and clamping action occur as shown at 156. The potential at the trigger switch input rises and the potential across diode 79′ builds up. As the potential rise at junction 78′ increases sufficiently above ground diode 79′ also goes hard into conduction thereby providing a very small network time constant. As a result differentiation becomes pronounced and the subsequent rise is rapidly terminated. In the embodiments shown herein the potential at junction 78′ rises to 0.75 volt as shown at 156 and the trigger switch input rises to about 0.3 volt being reduced by the voltage drop across diode 80′. The voltage rise just described is so maintained for the remainder of the duration of the ramp providing a positive voltage for a time sufficient to trigger the switch 70.

The circuit parameters have been so chosen such that when a count signal is applied, the potential at junction 78′ rises sufficiently above ground for a sufficient time to cause the input of trigger switch 70 to become positive enough to trigger. Yet when no signal is applied the voltage at the trigger switch input is clamped negative, inhibiting triggering.

When ramp 154 terminates, the potential at junction 78′ discharges back to ground first rapidly through diodes 80′ and 79′ as shown at 157, and then slowly through resistor 75′ as the diodes turn off as shown at 158.

Referring back again to further detailed description of FIG. 2 the module circuit, transistors Q2 and Q3 comprise the trigger switch 70 of FIG. 3. Transistors Q2 and Q3 form a bistable flip-flop switch with collector load resistors 81 and 88, respectively, connected to the voltage supply terminal V. The collector of Q2 is connected through resistor 82 to the base of Q3 and the collector of Q3 is connected through resistor 84 to the Q2 base. Resistors 83 and 85 are respectively grounded to the base of Q2 and Q3 to provide a ground return for minimizing back up thermal currents. When the base of Q2 is maintained considerably negative to ground the flip-flop is in its quiescent condition; transistor Q2 conducting, the Q2 collector and Q2 base at ground, transistor Q3 non-conducting and the collector of Q3 negative.

When the base of Q2 is provided with a positive potential, as well as a sufficient reverse current for a minimum time the flip-flop will trigger Q3 to conduction and bringing the collector of Q3 rapidly from its quiescent negative potential to ground. This ground potential at Q3 collector is fed back to the Q2 base locking up the flip-flop.

As a result capacitor 86 connected between the base resistor 87 of transistor Q4 and the collector of Q3 couples a positive potential to Q4 base turning transistor Q4, which was initially held to conduction through resistor 90 connected between the base of Q4 and the negative supply V, to non-conduction bringing the Q4 collector negative as shown in FIG. 4*b* at 136. Capacitor 86 begins to discharge through resistors 87 and 90 as shown at 135. When capacitor 86 discharges sufficiently negative, transistor Q4 becomes conducting once more terminating a count output pulse 134 at 137.

In the event an input count signal is applied coincident or nearly coincident to the trailing edge of a scan signal, a weak signal may be applied to the base of Q2 just insufficient to switch and lock the flip-flop through lock-up resistor 84, yet providing a variation in potential at the collector of Q3 which may be differentiated by capacitor 86 and resistors 87 and 90 to provide some output count at terminal E. Since the flip-flop will then fall back to its quiescent condition the next scan pulse will provide another output count signal causing a false count to be sent to the totalizer. A lock-up resistor 89 connected between the collector of Q4 and the base of Q3 is provided and is chosen so as to provide a switching and lock-up action to the flip-flop when a sufficient signal output from terminal E is produced which may be capable of leaving the OR unit and subsequently registering a count.

Subsequent scan pulses as shown in FIG. 4*a* at 132 provided prior to the termination of a count input pulse can not gate additional or false counts until the flip-flop is reset. Since the flip-flop already triggered and locked cannot gate any additional counts. It may also be noted that diode 80′ isolates the negative going leading edges of the scan pulses so that trigger switch 70 once triggered and locked cannot reset during a count input pulse.

Basically both the input count signal and the scan pulse signals feed into a common point, the input of the trigger switch. The circuit components and parameters as described before have been selected so that a triggering or positive potential is supplied to the input of the trigger switch only when a count input signal and subsequent scan pulse are applied.

An alternate method of gating input counts and avoiding the gating of false counts is to segregate the input count path from the input scan path, as shown in FIG. 7. Transistor Q5 essentially is in parallel with transistor Q2′ of flip-flop Q2′–Q3′. Transistor Q5 acts as a switch grounding junction 160 when input terminal D is not supplied with a count signal, and is open circuited when a count signal is supplied. Transistor Q2′ also acts as a switch to junction 160 essentially clamping 160 to ground when Q2′ base is negative and open circuits Q2′ collector whenever a scan pulse causes Q2′ base to go positive with respect to ground.

Whenever point 160 is maintained at ground, whether due to the conduction of either transistor Q1′ or Q5, the flip-flop Q1′–Q2′ will not trigger since the Q3′ base is maintained at ground. No count will be gated. However, when both transistors are non-conducting a count will be gated and the flip-flop will trigger. A count pulse terminating just prior to a positive going scan pulse, will cause Q5 to turn "on" grounding junction 160 and promptly resetting the flip-flop. A subsequent scan pulse cannot gate another count until another input count comes in through terminal D.

Though not limited thereto, the particular embodiment described herein can accurately count and totalize independent events occurring say it at the rate of 1200 events per minute per channel. At this rate the period between two consecutive events is 50 milliseconds. To insure sufficient time for the individual channel mechanical counters today found on the market to reliably respond to each input count, it is desirable to expand the time duration between count input signals coming from the presses.

A decade counter counting down by tens, supplying one pulse for every ten input counts has been used. The minimum period between counts supplied out of the decade counter is 500 milliseconds, providing ample time for mechanical counter resolution. The duration of an output count from the decade counter used in this embodiment is two input counts. Therefore the decade counter output pulse is of a minimum duration of 150 milliseconds as indicated in FIG. 4*a* at 131.

The timer clock pulse period as shown at 133 is chosen to be shorter in duration than the duration of a count pulse supplied to the gate circuit, here for convenience 3.3 milliseconds. This insures at least one scan signal for every count signal and insures the gating of each count. The scan circuits are chosen to provide delayed pulses such that no two scan pulses supplied to different gates occur simultaneously or overlap in time. As a result it is a necessity that the total delay time between the first scan unit output pulse and the last scan unit output pulse is less than the timer clock pulse period. Also, for the embodiment chosen here, although not limited thereto, the output of the last scan unit is not fed back into the first scan unit, but instead the net timer clock pulse initiates the succeeding chain of scan pulses.

For the purposes of this invention it may, however, be provided that the output of the last scan unit is connected to the first unit thereby generating a continuous series of pulses. In that case, however, the scan pulses would have to be set by a single trigger edge because a clock would provide overlapping and simultaneous scan pulses.

When a count pulse is supplied to the gate circuit the next scan pulse gates a count. As noted before each count gated out of the programmer unit causes the gate flip-flop to lock. Reset is provided by the termination of the count input signal.

At the termination of the count input signal as shown in FIG. 4*a* at 138, relay 69 of FIG. 3 (relays 15 of FIG. 1) are open circuited once more and the potential at the count input to the gate unit, terminal D, returns to —1.1 volts thereby turning the flip-flop back to its reset or quiescent condition by providing a sufficient negative potential and reset current to the flip-flop input. The low impedance of the reset path, resistory 74 and diode 79, is sufficiently low to cause the reset current to be very large thus overpowering any trigger current through diode 80 which may tend to retrigger the flip-flop when a positive going scan edge occurs just subsequent to a reset signal.

Counts gated out of the gate unit herein appear as negative pulses as shown at 134. Diode 92 and 92′ as shown in FIGS. 2 and 3 are an integral part of the succeeding stage OR unit of FIG. 1 shown at 33.

Diode 92 of the various channel gate circuits are direct connected through switch 26, shown in FIG. 1, to a preselected OR circuit, and permit negative pulse counts to enter the unit. The OR units act as a central channel, for channeling all incoming pulses from the preselected individual presses into a predetermined central totalizer. Counts from the individual channels are segregated in time and enter and leave the OR unit sequentially thereby insuring no "run-on" loss of counts.

Capacitor 86 and resistors 87 and 90 of the programmer shown in FIG. 2 segregate the individual output counts that may result from two immediately succeeding scan pulses. For example, in FIG. 4*a* let us look at scan pulses 127 and 139.

The output counts that may be provided by these two scan pulses must be recognized as two separate counts by the OR channel to provide accurate totalizing. As discussed before, the time duration of an output pulse is determined by the discharge time constant of capacitor 86 and resistors 87 and 90 as well as the voltage supply potentials and the voltage rise coupled through capacitor 86 from the flip-flop collector of Q3. This discharge is shown in FIG. 4*b* at 135 and is chosen such that the output pulse duration is adequate to reliably initiate an OR recognition, but is short enough as to allow the OR circuit to recover before the next possible output circuit pulse occurs. Thus immediately sequential counts are segregated in time to provide accurate recognition by the OR units as shown by the two sequential counts 137 and 140 arising from scan pulse 127 and 139.

Decade counters 34 of FIG. 1 receiving count pulses channeled out of the OR unit provides a single count for every ten input pulses. This countdown by ten is necessary at this point to provide sufficient response time for the mechanical counter 38 of FIG. 1, because two consecutive pulses leaving the OR units can occur within 175 microseconds, the time interval between consecutive scan pulses which is clearly insufficient for mechanical counter count recognition and resolution.

It may be noted that if the scan pulse period is just shorter than the minimum duration of the count signals applied to the gate units (e.g., for the values used herein somewhat less than 100 milliseconds), and if the scan pulse widths are slightly less than $1/n$ times the scan period, where $n$ is the number of individual channels (i.e., approximately 25 milliseconds here for 6 channels), then if all $n$ gates are supplied with simultaneous count inputs, $n$ output pulses will be gated to the OR channel within the time duration of the first scan period. Then since the gate circuits lock up after each gated count, no additional counts can reach the OR channel until the next count input to the gate circuit occurs, which here would not be for a minimum of 500 milliseconds later.

When $n$ is less than ten, for example six in this particular embodiment, seven counts at a minimum would take 500 milli-seconds, while any two consecutive ones may occur within 25 milli-seconds (here 175 micro-seconds). By counting down by $n+1$ or more, the resolution between counts are expanded sufficiently to segregate counts for reliable readout by the mechanical counters. In the embodiment described herein a countdown by 10 was used for convenience.

Output counts from the decade counters 34 are extended over two input counts so that an output pulse is a minimum of three scan pulse widths, although the pulse period is a minimum of 500 milli-seconds. These countdown pulses are fed through driver 36 in FIG. 1 which supplies the necessary signal currents and pulse width to reliably operate the relays 37 for the mechanical counters 38. Relay resolution between pulses is assumed by the larger 500 milli-second minimum pulse period.

Decade counters 34 simultaneously provides countdown pulses to the totalizers 45. Such counts correspond to the counts displayed in the mechanical counters 38.

Reference is now made to FIG. 8 for a specific embodiment of the central counter totalizer 45 of FIG. 1 and the associated preset AND switches. Four decimal digits are represented by the blocks 180, 181, 182 and 183. Due to the two countdowns by tens these four decimal digits can represent Arabic numbers up to one million. In this fashion the blocks are labeled starting with the hundreds place. Each decimal digit block is a binary-coded decimal counter in which each Arabic digit is represented by four binary bits capable of coding ten different decimal characters.

Each bit is represented by the state of a bistable flip-flop. The two states are represented by two discrete voltage levels. One commonly called a "0" and the other a "1." For convenience in this discussion ground potential will be considered to correspond to a binary "1" and a negative voltage will be considered to correspond to a binary "0."

The sequencing of the code is two different combinations of binary representation as shown in FIG. 9. On the tenth count the counter automatically clears sending a count to the next group of four binary coded decimals representing the next decimal digit through lines 169 in FIG. 8.

Switch 171 is the timer clear switch which sends a clear signal through lines 172 to reset the entire counter to the zero decimal and binary condition when the switch is closed thereby permitting the system to be in a position to totalize a new edition. Clearing the counter also sends an inhibit signal through line 170 to timer 18 stopping the clock timer signal and the scan pulses.

The preset AND units 52 schematically indicated in FIG. 1 are shown in FIG. 8 indicated at the top of the figure by diodes and switches. Lines 184 are connected internally to the counters at bistable potential junctions, being supplied a negative potential when an "0" representation exists in the flip-flop and a ground signal when a "1" bit is present in the associated flip-flop. For purposes of description lines 184 are shown labeled 1, 2, 4 and 8, respectively, indicating the binary decimal coding as shown in FIG. 9.

The preset AND switches 185 can be preselected to any count to provide an automatic indication that the count has been reached. Appropriately coded switches are closed to select the count to be detected. When the preselected count is reached an appropriate signal is sent to the alarm relay drivers through line 174 thereby announcing the count.

For example, if arabic decimal 674,300 is selected preset switches 4 and 2 of the hundred-thousands counter would be closed as shown at 175, switches 4, 2 and 1 of the ten-thousands counter would be closed as shown at 176, switch 4 at 177 in the thousands counter, and switches 2 and 1 at the hundred counter at 178. All the others would remain open. As the count pulses enter the central counter through line 179 the four flip-flops in each binary coded decimal digit counter change as indicated from left to right by the wave forms in FIGS. 4*a* and 4*b*. At any decimal representation other than 674,300 a negative potential will appear across the diodes in the closed switch lines 175 through 178 whose corresponding flip-flops are in the "0" or negative potential condition, while the remaining diodes will be nonconducting and essentially open circuited. A negative potential will then be supplied through line 174 to the relay driver 55 which inhibits the driver output.

However, when the preselected count is reached, all preselected closed switch lines will essentially reopen since all diodes will essentially open circuit. The driver (which may be a bistable resistive coupled amplifier) triggers when no negative signal is supplied to its input driving the alarm relays announcing the count.

For the purpose of this invention other coincident AND units may be used. Also, the diodes as used in the AND switches may be reversed or replaced by resistors to detect other voltage levels representing the count in the binary counter although modifications must be made as will be understood by those familiar with the art.

As an aid to the ready practice of the invention the following specific values for the circuit components of the programmer module are given:

| | | |
|---|---|---|
| Resistors **82, 84** | ohms | 3.3K |
| Resistors **74, 74, 83, 83, 85** | do | 470 |
| Resistors **73, 76, 81, 88, 87, 91** | do | 1K |
| Resistors **75, 75** | do | 6.8K |
| Resistor **90** | do | 4.7K |
| Resistor **72** | do | 18K |
| Diodes | | 1N118 |
| Capacitors **77, 77, 86** | microfarads | .005 |
| Capacitor **71** | do | .015 |
| Transistors are PNP | | 2N404 |

The value of resistor 89 is not given for its value as discussed before depends on the particular OR units used.

It will be understood that these component values may be changed to meet the requirements of particular applications. Also, if different transistors or diodes are employed, the values may be selected for optimum results with those transistors. For example, NPN transistors may be used instead of PNP transistors as here described but polarities and diode connections as well as appropriate other modifications must be made. Also diodes 79 and 79' may be replaced by a resistor of sufficient resistance to maintain the Q2 base negative by an appropriate voltage division when count input terminal D is grounded at the application of a count pulse. Q2 base will then be maintained negative through resistors 84 and 88 to the negative supply. Also, for this modification resistor 74 will have to be changed to provide a total low impedance path to the negative supply through 74 and 79 to the base of Q2 to provide a very large amount of current into the base of Q2 at the termination of a count pulse so that an immediately subsequent positive-giving scan pulse edge cannot cause enough current to turn Q1 off, thereby preventing a false count. In effect, the low impedance path through 74 and 79 to Q2 swamps reset current into the base of Q2 when a count is terminated preventing capacitor 77, having a relatively greater impedance as a result of the rise time of the scan edge introduced into capacitor 77, from being able to buck the reset count.

Other modifications may be made in accordance with the purposes of this invention as will be apparent to those skilled in the art.

We claim:

1. A system for totalizing randomly occurring independent events from a plurality of sources comprising, in combination, a plurality of independent event count pulse sources providing like output signals for like but randomly occurring events, a timer pulse unit providing periodic clock pulses, a plurality of scan pulse units corresponding in number to said event count sources and responsive to each clock pulse to provide a series of progressively delayed scan output pulses, a plurality of gate units each of which comprises a count input portion for receiving count pulses from one of said count pulse sources, a scan pulse input source for receiving pulses from one of each scan pulse units, a trigger switch pulse output portion, and a common junction between the input to said trigger switch, and said count and scan input portions, said trigger switch in one bistable condition triggering to another condition when the voltage at the common junction reaches triggering level, said scan pulse input portion including a coupling capacitor and isolating diode for coupling a positive potential to said diode bringing said diode to conduction to bring the voltage at the common junction to said triggering level when a count pulse is applied to said count pulse input portion and a scan pulse is thereafter applied to said scan input pulse portion, and means connected to receive the individual output pulses from said gates and totalize them as received.

2. The combination according to claim 1 wherein in each gate unit said count input portion has an isolating diode which is conductive when no count signal is supplied to said count input portion to limit the subsequent voltage rise through the diode in the scan input portion to a predetermined level which prevents the voltage to which the trigger switch input is subjected exceeding triggering value, and wherein said isolating diode becomes non-conducting when a count pulse is supplied to said count input portion to permit a following scan pulse to cause the voltage at said common junction to rise to triggering level.

3. The combination according to claim 2 wherein in each gate unit the diode in said scan input portion is poled to maintain the voltage at the common junction at triggering value for the duration of a count input signal.

4. The combination according to claim 1 wherein each gate unit includes means for locking said trigger switch in said other condition after an output signal is produced and is capable of being recognized as a count, and wherein means are included for automatically resetting said trigger switch to said one bistable condition after a count output signal is produced and the count pulse applied to said count input portion is thereafter terminated.

References Cited by the Examiner

UNITED STATES PATENTS

| | | | |
|---|---|---|---|
| 1,823,960 | 9/1931 | Troutman | 235—92 |
| 2,207,715 | 7/1940 | Bumstead | 235—92 |
| 2,767,908 | 10/1956 | Thomas | 235—92 |
| 2,978,174 | 3/1961 | Dean et al. | 235—92 |
| 3,040,984 | 6/1962 | Cox et al. | 235—92 |
| 3,063,632 | 11/1962 | Stringer et al. | 235—92 |
| 3,166,637 | 1/1965 | Oleson | 178—26 |

DARYL W. COOK, *Acting Primary Examiner.*

MALCOLM A. MORRISON, *Examiner.*

J. F. MILLER, *Assistant Examiner.*